US010372161B2

(12) United States Patent
Plante et al.

(10) Patent No.: US 10,372,161 B2
(45) Date of Patent: Aug. 6, 2019

(54) DOCKING SYSTEM

(71) Applicant: Amphenol Thermometrics, Inc., Saint Marys, PA (US)

(72) Inventors: Dennis Plante, Billerica, MA (US); Frank Kies, Straubenhardt (DE); Himangshu Chowdhury, Hyderabad (IN); Santosh Darshan, Hyderabad (IN); Mark A. Denovellis, Chelmsford, MA (US)

(73) Assignee: Amphenol Thermometrics, Inc., Saint Marys, PA (US)

( * ) Notice: Subject to any disclaimer, the term of this patent is extended or adjusted under 35 U.S.C. 154(b) by 277 days.

(21) Appl. No.: 15/072,999

(22) Filed: Mar. 17, 2016

(65) Prior Publication Data
US 2016/0195899 A1    Jul. 7, 2016

Related U.S. Application Data

(63) Continuation-in-part of application No. PCT/US2014/064470, filed on Nov. 7, 2014.

(30) Foreign Application Priority Data

Dec. 16, 2013  (IN) .......................... 5840/CHE/2013
Mar. 17, 2015  (IN) ............................ 728/DEL/2015

(51) Int. Cl.
*G06F 1/16* (2006.01)
(52) U.S. Cl.
CPC .................................. *G06F 1/1632* (2013.01)
(58) Field of Classification Search
CPC .................................................... G06F 1/1632

USPC .................. 361/679.43, 679.41, 679.02
See application file for complete search history.

(56) References Cited

U.S. PATENT DOCUMENTS

| 6,193,546 | B1 * | 2/2001 | Sadler ..................... A45F 5/02 |
| | | | 439/165 |
| 6,339,699 | B1 * | 1/2002 | Hirai ................... B60R 11/0241 |
| | | | 379/413.01 |
| 6,716,058 | B2 * | 4/2004 | Youn ..................... G06F 1/1632 |
| | | | 439/165 |
| 6,765,792 | B2 * | 7/2004 | Yin ....................... G06F 1/1632 |
| | | | 361/679.23 |
| 6,898,080 | B2 * | 5/2005 | Yin ....................... G06F 1/1632 |
| | | | 361/679.41 |

(Continued)

FOREIGN PATENT DOCUMENTS

EP          3084550 A1    10/2016
WO    WO-2015094508 A1    6/2015

OTHER PUBLICATIONS

International Preliminary Report on Patentability and Written Opinion, dated Jun. 21, 2016, 9 pages.

(Continued)

*Primary Examiner* — Rockshana D Chowdhury
(74) *Attorney, Agent, or Firm* — Blank Rome LLP

(57) ABSTRACT

The invention provides a docking system for a portable device, comprising a housing assembly disposed partially within an input-output module and operable between a plurality of viewing angles, at least one retaining member for coupling the housing assembly to the input-output module, and a locking sub-system provided on the housing assembly for locking the portable device to the housing assembly.

23 Claims, 15 Drawing Sheets

(56) References Cited

U.S. PATENT DOCUMENTS

| | | | | |
|---|---|---|---|---|
| 2005/0190533 A1* | 9/2005 | Hultzman | ............... | E05D 11/08 |
| | | | | 361/679.21 |
| 2008/0239658 A1* | 10/2008 | Chou | ................... | G06F 1/1632 |
| | | | | 361/679.38 |
| 2010/0001163 A1* | 1/2010 | Takizawa | ............ | F16M 11/105 |
| | | | | 248/371 |
| 2011/0117833 A1* | 5/2011 | Hong | ................... | G06F 1/1632 |
| | | | | 455/3.06 |
| 2012/0299547 A1* | 11/2012 | Lee | ...................... | G06F 1/1632 |
| | | | | 320/115 |
| 2013/0021164 A1* | 1/2013 | Heaton | ................ | G06F 1/1632 |
| | | | | 340/687 |

OTHER PUBLICATIONS

International Search Report and Written Opinion, dated Jun. 16, 2016, 10 pages.
Supplementary European Search Report for EP Application No. EP 16765776, dated Oct. 29, 2018, 12 pages.

\* cited by examiner

DOCKING SYSTEM

RELATED APPLICATIONS

This application claims priority to India Application No. 728/DEL/2015, filed Mar. 17, 2015, and is a continuation-in-part of International Patent Application No. PCT/US2014/064470 filed Nov. 7, 2014, which claims priority to Indian Patent Application No. 5840/CHE/2013 filed Dec. 16, 2013, the entire disclosures of which are incorporated herein by reference.

FIELD OF THE INVENTION

The invention relates generally to docking system and more specifically to a docking system for a portable device for use in a thermal validator system.

BACKGROUND OF THE INVENTION

Generally, a validator system is a standalone thermal validation system that simplifies the entire validation process by reducing set-up time, minimizing sensor handling, and presenting critical study data in easily customized report formats. Typically, the validator system consists of a central processing unit (or an input-output module), a power supply, and data storage device(s) incorporated into the main single body with an integrated screen with buttons for input. Sometimes, a touch screen panel is employed which provides both the input as well as the display (output) functions. The rear side of the validator typically has several input/output docks to connect to various sensors, computer and peripherals.

However, this type of system lacks flexibility due to the integrated screen and hardware combination. Flexibility constraints may be understood as flexibility with respect to size and shape of display. In addition, there is a limitation on the viewing angle of the screen since it is restricted by the fixed position of the screen with respect to the docking station. Sometimes when a separate computing device is required in addition to the integrated screen, the device occupies more space and vastly reduces the portability of the device.

Tablet computers may intend to overcome these limitations, since tablets are typically slim, slate-like devices that may use detachable or desktop keyboards and mice. What makes the tablet unique is its integration of touch (e.g., by hand or stylus) and speech input capabilities with state-of-the-art laptop capabilities. However, tablet computers, when used with an input output module (I/O module) of a thermal validator, still needs a docking space separate from the I/O module.

Hence, there is a need to design a docking system for a portable device, such as a tablet computer, to be used with an I/O module which addresses the aforementioned issues.

SUMMARY OF THE INVENTION

The invention provides a docking system for a portable device, comprising a housing assembly disposed partially within an input-output module and operable between a plurality of viewing angles, at least one retaining member for coupling the housing assembly to the input-output module, and a locking sub-system provided on the housing assembly for locking the portable device to the housing assembly.

The invention further provides a docking system for a portable device, comprising a housing assembly at least partially receiving the portable device and operable between a plurality of viewing angles, and a locking sub-system provided on the housing assembly for locking the portable device to the housing assembly.

Another aspect of the invention is a method for securing a portable device, comprising the steps of sliding the portable device in a housing assembly, the housing assembly comprising a front enclosure portion formed by a front wall, a side wall and a back wall, and a back cover disposed on a backside of the front enclosure portion, guiding the portable device in the housing assembly, and locating the portable device in the housing assembly.

Yet another aspect of the invention is a method of assembling a docking system, comprising the steps of securing a locking sub-system to a front enclosure portion, securing a back cover to the front enclosure portion, installing a stiffening member to the front enclosure portion, and fixing at least one friction hinge between the stiffening member and a first end of at least one retaining member, wherein a second end of the retaining member is mounted to an input-output module.

The invention further provides a housing assembly for a docking system, comprising a front enclosure portion formed by a front wall, a side wall and a back wall, wherein the front wall of the front enclosure portion extends obliquely downward and rearward towards the back wall forming a U-shaped structure, and a back cover disposed on a backside of the front enclosure portion.

Another aspect of the invention provides a locking sub-system for portable device, comprising a switching means and an actuating lever having a snap for locking the portable device, wherein actuation of the switching means unlocks the portable device from the actuating lever.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

BRIEF DESCRIPTION OF THE INVENTION

Figure 1:
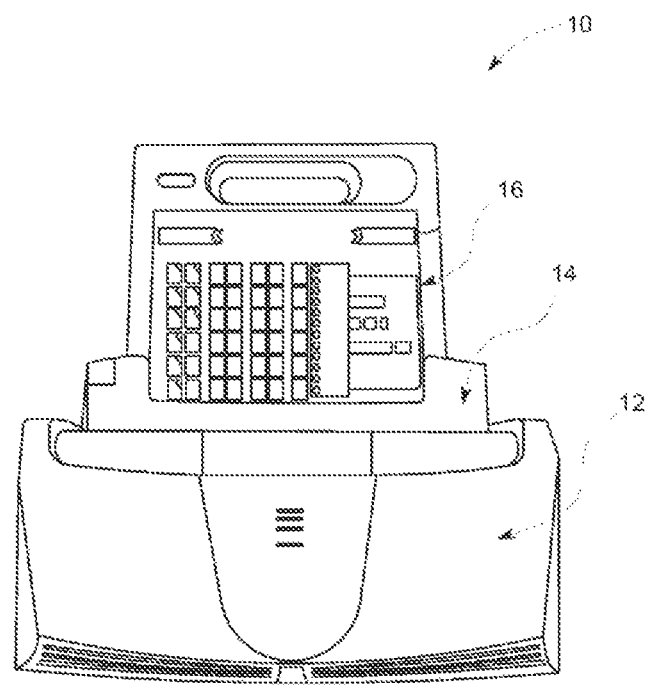
FIG. 1 is a front elevation view of a docking system including an input-output module and a housing assembly in accordance with an embodiment of the invention.

In accordance with one embodiment of the invention, a docking system for a portable device is provided. The docking system for a portable device is for use in thermal validator system. The docking system allows the use of tablet computer (portable device) with an input-output module of the thermal validator system.

The docking system includes a housing assembly, a locking subsystem and a retaining member. The locking subsystem is provided on the housing assembly for locking and unlocking the portable device when disposed inside the housing assembly. The retaining member couples the housing assembly to an input-output module.

The retaining member employs a friction hinge, which is mounted between the housing assembly and the retaining member. This allows a multiple viewing orientation for the tablet computer when it is housed within the housing assembly. The user may manually adjust the tablet computer to his comfortable viewing angle.

The housing assembly is partially disposed within the input-output module and the tablet computer is Furthermore, received by the housing assembly through a guide plate and dowel guide(s). This presents advantage in the present invention by preventing an incorrect engagement of the tablet computer to the housing assembly connector.

In accordance to one embodiment of the present invention, the locking subsystem includes a switching means and an actuating lever having a snap for locking the tablet computer, wherein the actuation of the switching means unlocks the portable device from the actuating lever. The present invention discourages unwanted removal of the tablet computer from the housing assembly, this is achieved by the locking subsystem which forms an integral part of the housing assembly.

In accordance with another embodiment, of the present invention, a docking system includes a front enclosure portion, which is formed by a front wall, a side wall and a back wall. The front wall extends obliquely downward and rearward towards the back wall to form a U shaped structure. Furthermore, a back cover is provided on the backside of the front enclosure portion.

Yet, in accordance with another embodiment, of the present invention, a method of assembling a docking system includes the steps of securing a locking subsystem securing a locking sub-system to a front enclosure portion; securing a back cover to said front enclosure portion; installing a stiffening member to said front enclosure portion; and fixing at least one friction hinge between the stiffening member and at least one retaining member, wherein the other end of the retaining member is mounted to an input-output module.

Furthermore, in accordance with another embodiment, of the present invention a method for securing a portable device, includes the steps of sliding the portable device in a housing assembly; guiding the portable device in said housing assembly; and locating the portable device in said housing assembly.

The present invention provides a major advantage by allowing the users to interface with a tablet computer which may be easily mounted and removed from to the input-output module. This also provides the benefits in terms of portability and compactness.

DETAILED DESCRIPTION OF THE INVENTION

As discussed in detailed below, in the present invention a docking system for a portable device is provided. The docking system comprises a docking station, such as a housing assembly, to be disposed partially within a base module, such as an input-output module, and is mechanically operable between a multiple of viewing angles. At least one retaining member is used for coupling said housing assembly to said input-output module. The housing assembly is adapted to receive a portable device within it. Furthermore, a locking sub-system is provided on said housing assembly for locking said portable device to said housing assembly. The portable device which is a tablet computer has a multiple of contacts positioned in the midway of the tablet to facilitate aligning the tablet to the housing assembly.

FIG. 1 is a diagrammatic illustration of a front elevation view of a docking system 10. The docking system 10 includes an input-output module 12, a housing assembly 14 and a portable device 16. The docking system 10 is designed such that the portable device 16 communicates data to/from the input-output module 12 via housing assembly 14. The portable device hereinafter will be referred to as tablet computer and may be any table computer known in the art. In a particular embodiment, the input-output module accommodates multiple various inputs, including a subscriber identity module (SIM) input 1102 (see FIG. 11A), sensor inputs, and the like and may accept any combination of thermocouple, voltage or current inputs such as humidity and pressure transducers. Furthermore, the input-output module is adapted for processing and monitoring various inputs. The housing assembly 14 is secured to the input-output module 12, such that the housing assembly 14 is disposed at least partially within the input-output module 12. The housing assembly 14 is separate and removable from the input-output module 12. The tablet computer 16 is furthermore disposed within the housing assembly 14 and is mechanically operated along with the housing assembly 14 for multiple viewing angles. The docking system 10 is designed such that it can be used with different housing assemblies 14 having different sizes, shapes, electronics, plugs, and the like.

Figure 2:
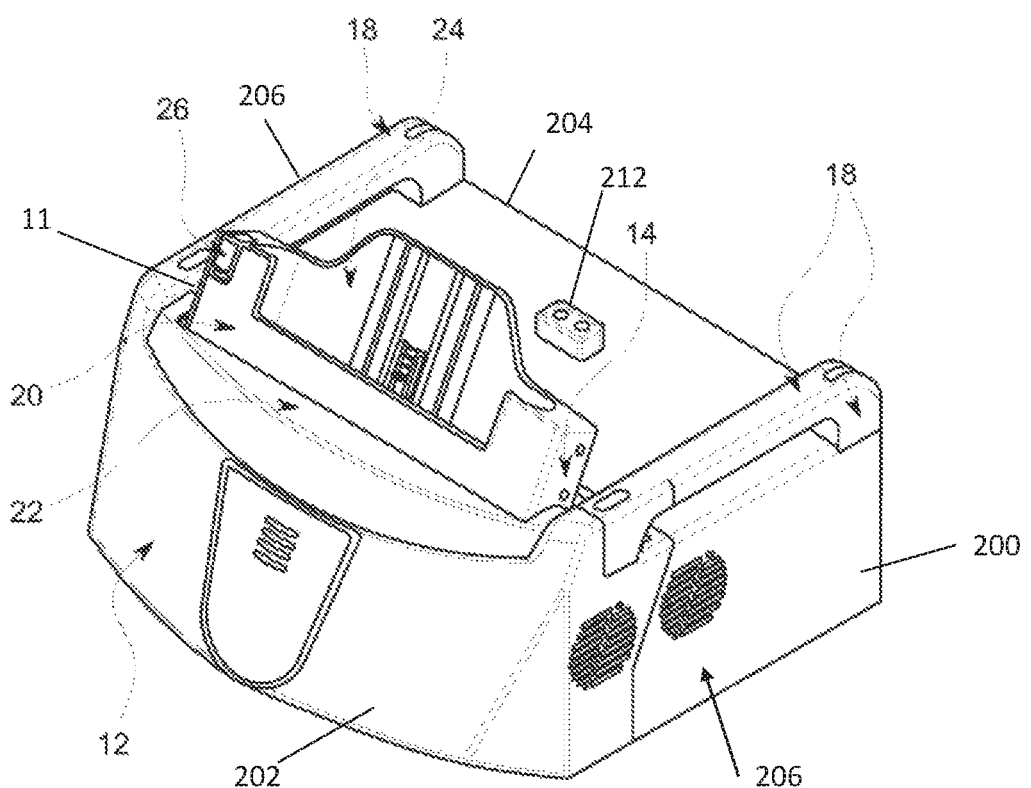
FIG. 2 is a front perspective view of the housing assembly of FIG. 1 coupled to the input-output module of FIG. 1, in accordance with an embodiment of the invention.
Figure 11A:
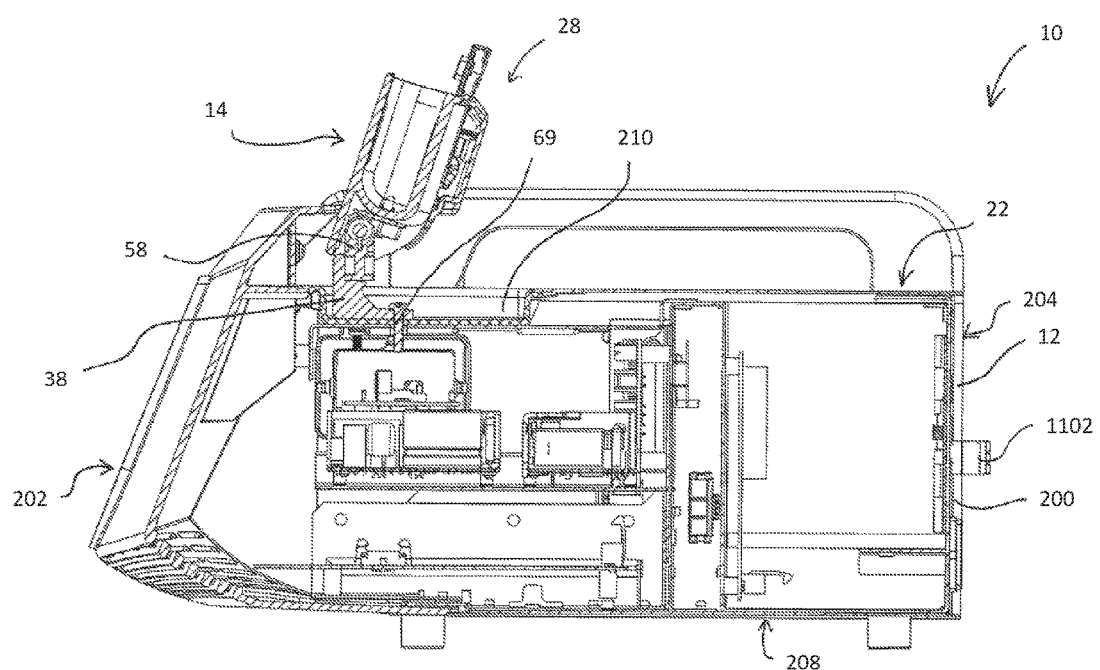
FIG. 11A is a cross-sectional side view of the housing assembly coupled to the input-output module of FIG. 2, in accordance with an embodiment of the invention.

FIG. 2 is a front isometric view of the housing assembly 14 coupled to the input-output module 12. In the illustrated example, the housing assembly 14 is partially disposed within the input-output module 12. The input-output module 12 is generally formed of a rectangular housing 200 having a front portion 202, rear portion 204, at least two sides 206, a top surface 22 and bottom surface 208. The top surface 22 is generally flat and has a recess 210 (FIG. 11A) toward the front portion 202 of the housing 200. The recess 210 receives the housing assembly 14 when the housing assembly 14 is folded down. The input-output module 12 is provided with at least two handles 18 on the top surface 22 of the input-output module 16. The input-output module 12 generally houses the docking system's 10 electronics, such as a processing device and memory (FIG. 11A).

As illustrated in FIG. 2, when the housing assembly 14 is coupled to the input-output module 12 on the top surface 22 near the front portion 202, the housing assembly 14 is partially disposed in the input-output module 12. In this arrangement, a front surface 20 of the housing assembly 14 extends beyond the top surface 22 of the input-output module 12. The back side or back wall 24 of the housing assembly 14 extends beyond the top edge of the front surface 20, such that it provides back support to the tablet computer 16 illustrated in FIG. 1. A locking subsystem 26 is provided on the housing assembly 14 for locking and unlocking the tablet computer 16. In a particular embodiment, the locking subsystem 26 is disposed at one end 11 of the housing assembly 14.

Figure 3:
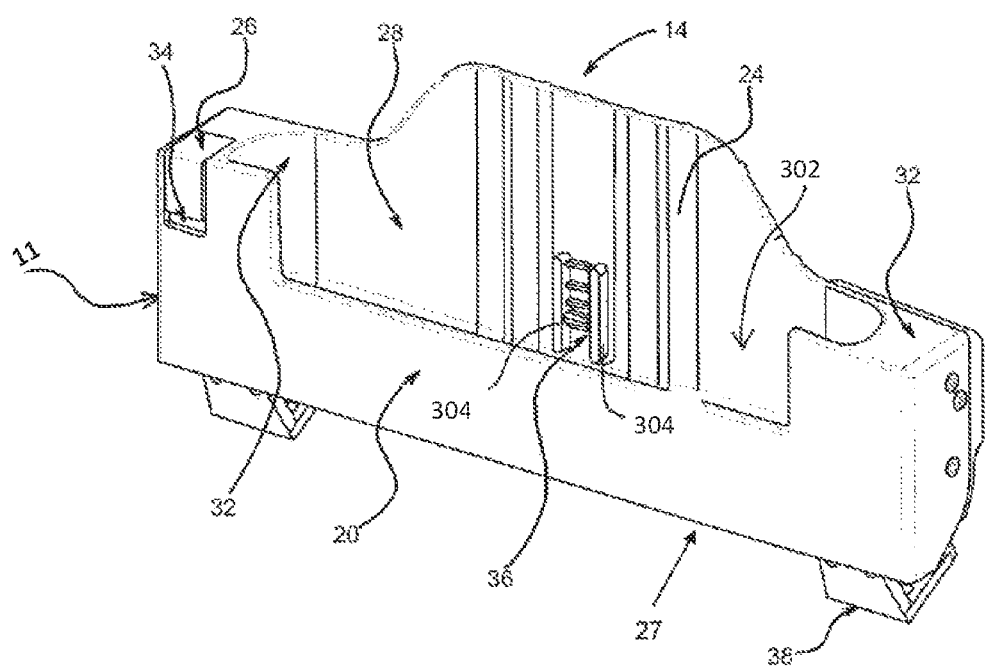
FIG. 3 is a front perspective view of the housing assembly of FIG. 1, in accordance with an embodiment of the invention.
Figure 4:
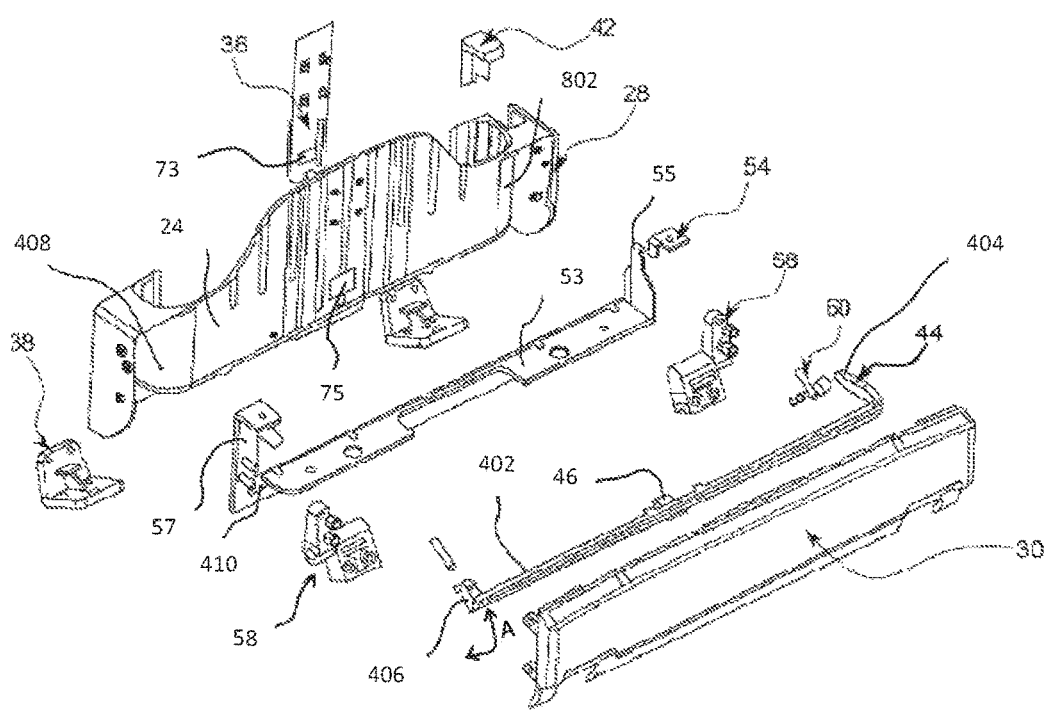
FIG. 4 is an exploded view of the housing assembly of FIG. 1, in accordance with an embodiment of the invention.

FIG. 3 is a front isometric view of the housing assembly 14 illustrated FIG. 1. FIG. 4 is an exploded view of the housing assembly 14 of FIG. 3, illustrating each component of the housing assembly 14, namely, the front enclosure portion 28, the guide plate 36, the back cover 30, the actuating lever 44, the stiffening member 54, the retaining member 38, the switch (push button) 42, the friction hinge 58, and the retaining spring 60.

The front enclosure portion 28 is formed by a front wall 20 (which is also referred as front surface in FIG. 2), side walls 32, a back wall 24 (which is also referred as back side in FIG. 2) and a base 27. In one embodiment, the front wall 20, the side walls 32, the back wall 24 and the base 27 are integrated into one piece to form the front enclosure portion 28. The front enclosure portion 28 forms a U-shaped structure having a channel 302 with an open top to at least partly receive and house the tablet computer 16 within it. In an illustrated example, the housing assembly 14 is formed of plastic. The front wall 20 is cut in a U-shape structure. One side wall 32 at end 11 of the front enclosure portion 28 is provided with a recess 34 to dispose the locking subsystem

26 within it (discussed herein). The back wall 24 serves as a back support for the tablet computer 16 and includes a hole 75 for locking the table computer 16 in place. At least one dowel guide 40 is also provided in the form of a pin-like protrusion on the base 27 of the front enclosure portion 28 on both sides of the connector 56 for aligning the tablet computer 16 (see FIGS. 9A-B).

Figure 5:
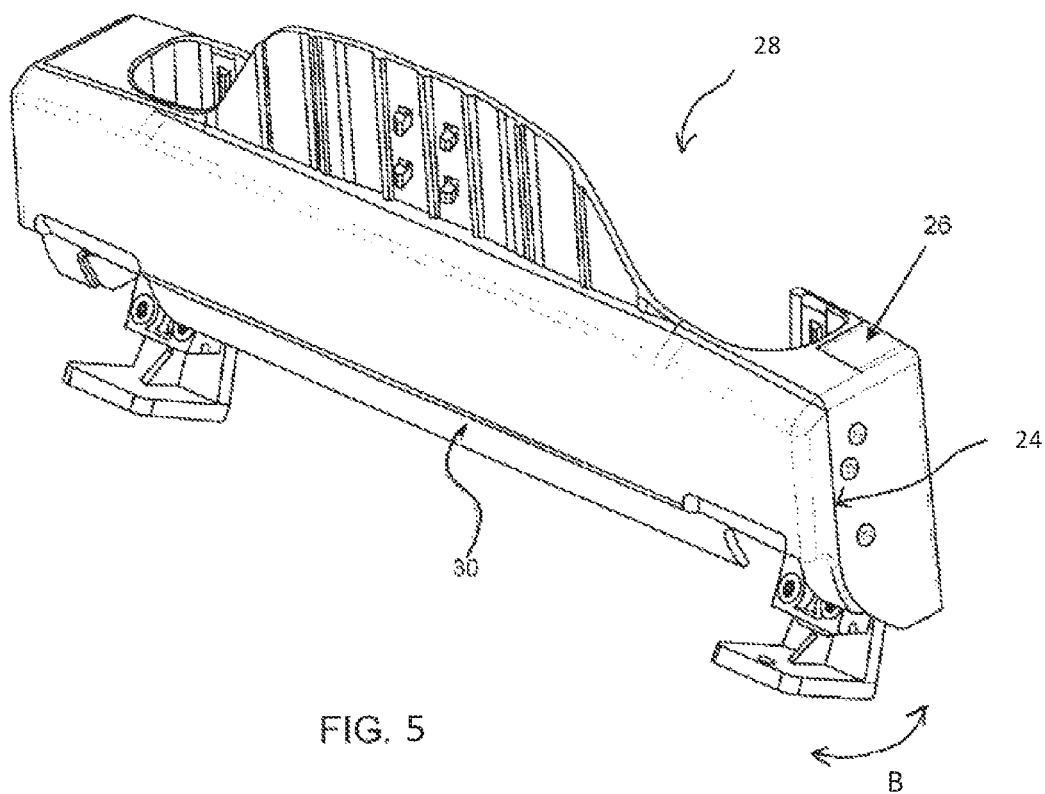
FIG. 5 is a rear perspective view of the housing assembly of FIG. 1, in accordance with an embodiment of the invention.

As seen in FIG. 5, a back cover 30 is disposed on the back wall 24 of the front enclosure portion 28 for antitheft and aesthetic reasons and is secured by any known means. The structure of the back cover 30 may be varied in many ways depending on the requirements for the purpose of this invention.

The guide plate 36 guides the tablet computer 16 as it is inserted into the front enclosure portion 28. The guide plate 36 is an elongated plate like structure with two elongated rails 304 extending along either side of the guide plate 36 and one or more cross-members (see FIG. 3). Hole 73 is positioned between the rails 304 (FIG. 4) for enabling the locking of the tablet computer 16 to the housing assembly 14 in cooperation with the front wall 20. The hole 73 is generally positioned at the bottom of the guide plate 36 and, when assembled, aligns with the hole 75 on the back wall 24 of the front enclosure portion 28. The guide plate 36 extends vertically along the back wall 24 of the front enclosure portion 28 at its midway section along its length (see FIGS. 3, 9A-B) and spaced up from the bottom. The guide plate 36 may either be integrated as part of the back wall 24 or it may exist as a separate part which is coupled to the back wall 24, such as by snaps, screws, bolts, or the like. The guide plate 36 may be formed of plastic or metal depending on the various requirements. The guide plate 36 may be varied in many ways as known in the art for the purpose of this invention. The number of guide plates 36 included within the front enclosure portion 28 is dependent on the tablet computer 16 design.

As shown in FIG. 4, the actuating lever 44 extends horizontally from one end to the other end of the front enclosure portion 28 along the back wall 24. The actuating lever 44 generally takes the form of an elongated rod 402 of rectangular cross section having an inverted L shape. An elongated snap or tab projection 46 is aligned at the center of the elongated rod 402 and projects forward from the rod 402. When the housing assembly 14 is assembled, the tab projection 46 is aligned with the hole 73 in the guide plate 36 and the hole 75 in the back wall 24 of the front enclosure portion 28. The elongated rod 402 of the actuating lever 44 includes an actuating arm 404 at one end and a coupling arm 406 at the opposite end. The actuating arm 404 is pivotally connected to an interior surface 802 of the side wall 32 (see FIG. 8A-B) of the front enclosure portion 28. The actuating arm 404 is coupled to the interior surface 802 by a pin at a pivot point 49 located toward a proximal end 804 of the actuating arm 404. A rolling element 48 is provided at a distal end 806 of the actuating arm 404. The coupling arm 406 is connected pivotally to the stiffening member 54 or to an end wall 408 of the front enclosure portion 28 so that the elongated rod 402 can swing up and down (direction A in FIGS. 4, 8A-B) when the switch 42 is engaged (discussed below).

Figure 8A:
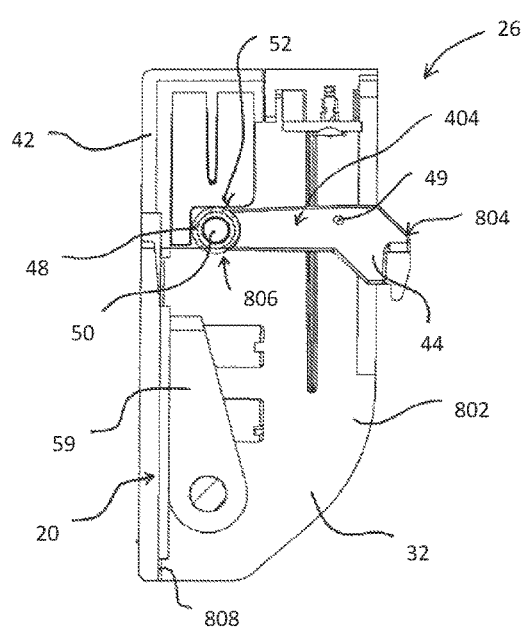
FIG. 8A is a cross-sectional view of a first section of the housing assembly illustrated in FIG. 7 taken along line 76, illustrating a locked position in accordance with an embodiment of the invention.
Figure 8B:
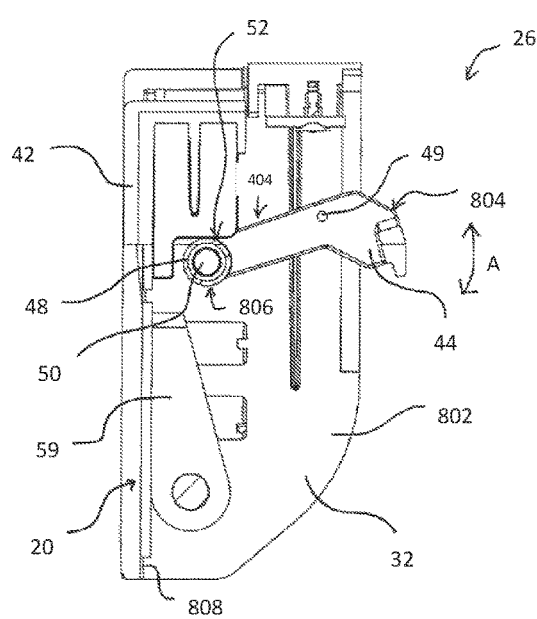
FIG. 8B is a cross-sectional view of a first section of the housing assembly illustrated in FIG. 7 taken along line 76, illustrating an unlocked position in accordance with an embodiment of the invention.
Figure 9A:
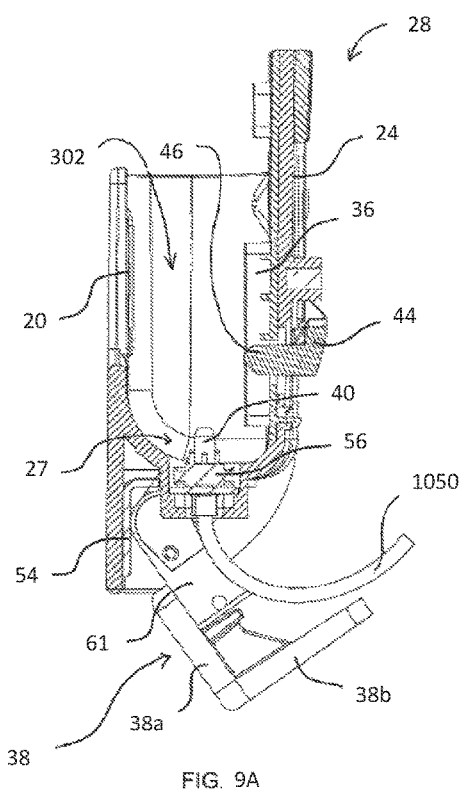
FIG. 9A is a cross-sectional view of a second section of the housing assembly illustrated in FIG. 7 taken along line 78, illustrating a locked position in accordance with an embodiment of the invention.
Figure 9B:
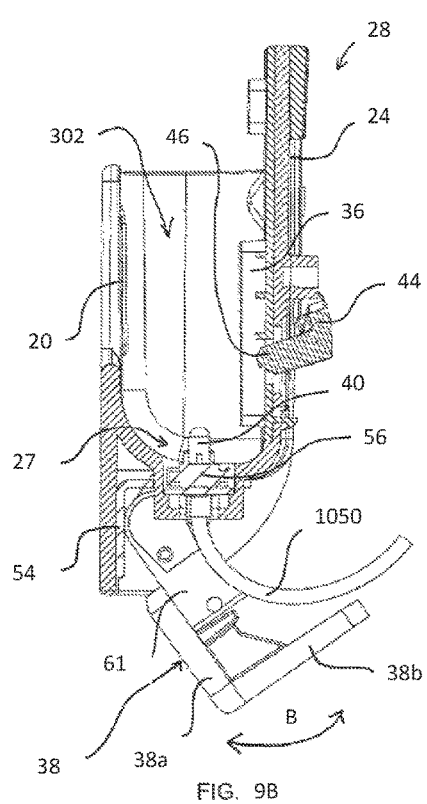
FIG. 9B is a cross-sectional view of a second section of the housing assembly illustrated in FIG. 7 taken along line 78, illustrating an unlocked position in accordance with an embodiment of the invention.

The stiffening member 54 is provided on the base 27 of the front enclosure portion 28 and provides additional rigidity to support the front enclosure portion 28 and the weight of the table computer 16 (see FIGS. 9A-B). The stiffening member 54 is generally formed of an elongated flat platform 53 having a downward perpendicular support 410 and opposing ends 55, 57 at which the stiffening member 54 is attached to the base 27 of the front enclosure portion 28. Specifically, the platform 53 is attached to an inside surface 808 of the front wall 20 at each end 55, 57 (see FIGS. 8A-B). The platform 53 and support 410 provide support to the base 27 of the front enclosure portion 28. The stiffening member 54 is preferably made of a rigid material such as sheet metal. It is to be understood that the stiffening member 54 may vary in size and shape depending on the design constraints.

Figure 6:
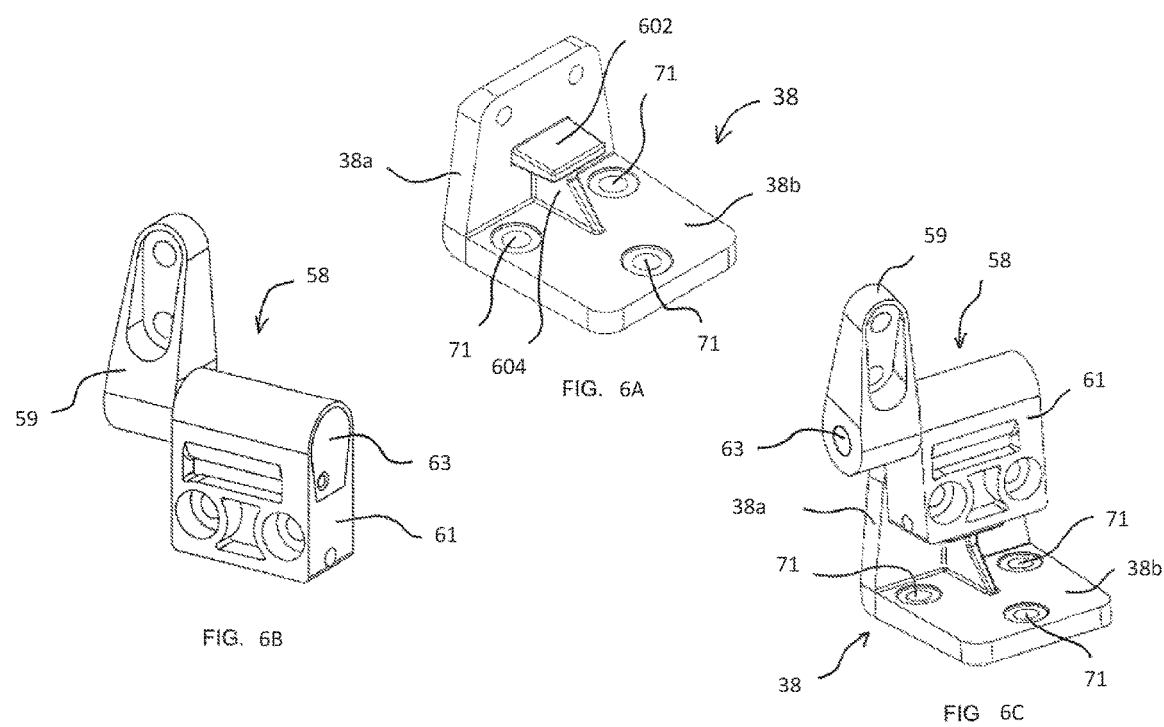
FIG. 6A is a front perspective view of a retaining member in accordance with an embodiment of the invention.
FIG. 6B is a front perspective view of a friction hinge in accordance with an embodiment of the invention.
FIG. 6C is a front perspective view of the friction hinge of FIG. 6A coupled to the retaining member of FIG. 6B, in accordance with an embodiment of the invention.

In an exemplary embodiment, the housing assembly 14 is coupled to the input-output module 12 via the at least one retaining member 38. As shown in FIG. 6A, the retaining member 38 is an L-shaped structure when viewed from the side and has two flat legs, 38a and 38b, each of which is perpendicular to the other. The retaining member 38 also includes a platform 602 which has a perpendicular support member 604 to support the weight of the housing assembly 14 when coupled to the input-output module 12. The upturned leg 38a of the retaining member 38 is secured to the friction hinge 58 as illustrated in FIG. 6C, such that the retaining member 38 extends downward with respect to the friction hinge 58. The leg 38a of the retaining member 38 may be secured to the friction hinge 58 via screws through openings in both the leg 38a and the friction hinge 58. The base leg 38b of the retaining member 38 includes a plurality of holes 71 and is semi-permanently fixedly coupled to the top surface 22 of the input-output module 12. In one embodiment, the retaining member 38 is preferably coupled to the top surface 22 of the input-output module 12 using fasteners, such as screws or bolts 69, which extend through the holes 71. The fasteners rigidly attach the housing assembly 14 to the input-output module 12 (see FIG. 11A) and are not easily removable without a tool. The retaining member 38 may also be provided with multiple pegs, pins, etc., so as to allow for attachment of the housing assembly 14 to the input-output module 12 using various known means in the art. In this way, the entire docketing system 10 is modular, as the housing assembly 14 can be removed by removing screws 69 which are readily accessible.

As illustrated in FIGS. 4 and 6c, the friction hinge 58 is mounted between the inside surface 808 of the front wall 20 (and the stiffening member 54) on the front enclosure portion 28 and the retaining member 38. In an exemplary embodiment, the friction hinge 58 is a position control constant torque type hinge having smooth zero backlash operation. It is also a space efficient design which provides high torque in minimum space. The friction hinge 58 may not require adjusting. In an exemplary embodiment, the friction hinge 58 is made up of zinc alloy and steel. The friction hinge 58 may withstand about 1000 N maximum static load on radial load and about 1200 N maximum static load on axial load. The friction hinge 58 is selected for at least about 20,000 cycles performance within plus or minus 20% of static torque specification.

As shown in FIG. 6B, the friction hinge 58 has a first arm 59, a second arm 61 and a common shaft 63 rotatably connecting the first arm 59 and the second arm 61. The first arm 59 rotates with respect to the second arm 61 in a controlled manner and provides a smooth rotation. The first arm 59 is mounted with screws to the inside surface 808 of the front wall 20 of the front enclosure portion 28, which holds the table computer 16, through the stiffening member 54 (see FIGS. 9A-B). The second arm 61 is mounted to the retaining member 38 as discussed above, and the retaining member 38 is coupled to the input-output module 12. The first arm 59 and second arm 61 may be mounted using any means known in the art, including screws or bolts (not shown). In this way, the retaining member 38 and friction hinge 58 rotatably couple the input-output module 12 to the housing assembly 14 housing the tablet computer 16.

Figure 11B:
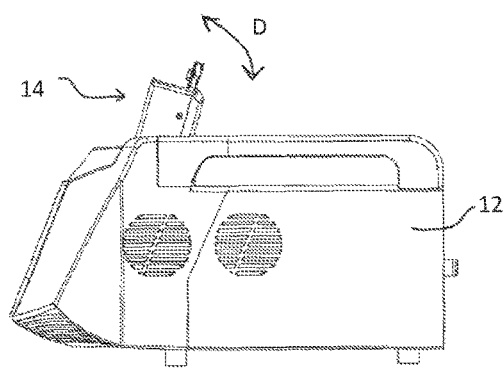
FIG. 11B is a side view of the housing assembly coupled to the input-output module of FIG. 11A, showing the housing assembly in an upright position, in accordance with an embodiment of the invention.
Figure 11C:
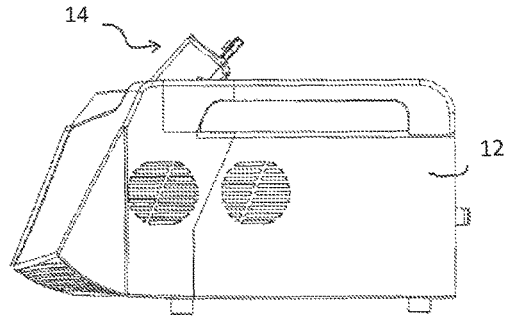
FIG. 11C is a side view of the housing assembly coupled to the input-output module of FIG. 11A, showing the housing assembly in an angled position, in accordance with an embodiment of the invention.

The friction hinge 58 allows multiple viewing orientations of the tablet computer 16, making it easier to view and operate while positioned in the housing assembly 14. The friction hinge 58 stays in its position unless moved by the user. The friction hinge 58 allows the tablet computer 16 to be rotated with respect to the input-output module 12, such that the viewing orientation of the tablet computer 16 may vary from about 0 degrees to about 70 degrees, as illustrated in FIGS. 11B-C. It is to be understood that the range of viewing angle may vary depending on the selection of the friction hinge 58 and design requirements.

Figure 7:
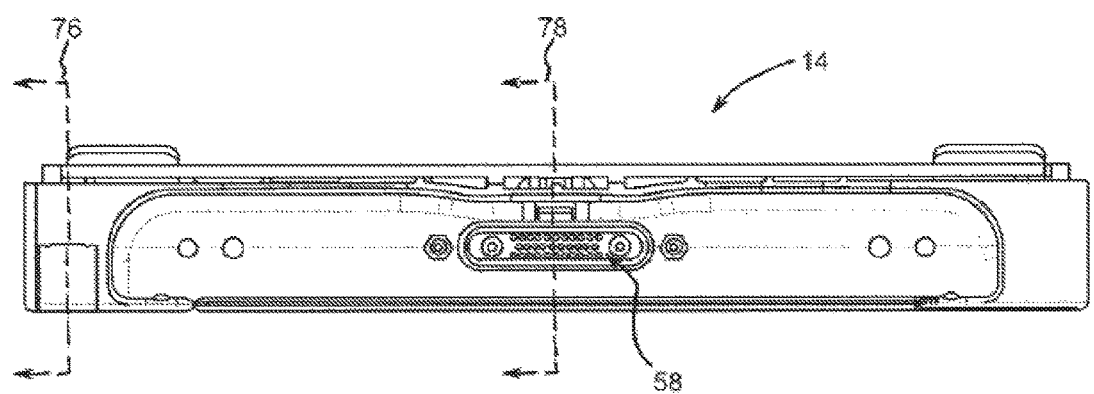
FIG. 7 is a top view of the housing assembly of FIG. 1, in accordance with an embodiment of the invention.

FIG. 7 is a top view of the housing assembly of FIG. 3. FIG. 5 illustrates two different cross-sections taken at two locations on the housing assembly 14. The first section 76 is illustrated in FIGS. 8A-B, and the second section 78 is illustrated in FIGS. 9A-B.

FIGS. 8A-B illustrate cross-sectional views of the first section 76 shown in FIG. 7. FIG. 8A depicts the quick-release locking subsystem 26 illustrated in FIG. 2 in its locked position. The locking subsystem 26 includes a switching means (push button) 42 for locking the portable device 16 into the housing assembly 14. In one embodiment, the switch 42 is a push button. Actuation of the switch 42 moves the arm 404 of the actuating lever 44 to unlock the portable device 16 from housing assembly 14. As shown in FIG. 8A, a distal end 806 of the arm 404 of the actuating lever 44 is positioned in an upward position, while a proximal end 804 of the arm 404 is positioned in a downward position. In this locked position, the elongated rod 402 is down such that its tab projection 46 extends through the hole 73 of the guide plate 36 and the hole 75 of the back wall 24 of the front enclosure portion 28 (see FIG. 9A-B) and engages an opening on the housing of the tablet computer 16 (not shown) to hold it in place. In this way, the tablet computer 16 is firmly held within the housing assembly 14 by the tab projection 46. Because the channel 302 of the front enclosure portion 28 at least partly surrounds the bottom portion of the tablet computer 16 on all sides, the tablet computer 16 can only move upward from the base 27 of the front enclosure portion 28. Thus, when the tab projection 46 is positioned within the opening on the back of the tablet computer 16, it prevents the tablet computer 16 from being pulled out of the front enclosure portion 28.

FIG. 8B illustrates the quick-release locking subsystem 26 in its unlocked position. When the push button 42 is depressed by a user in the direction C, the lower end 52 of the push button 42 exerts a downward force on the rolling element 48, which rotates about the pin 50, thereby transmitting the motion to the arm 404 of the actuating lever 44. In turn, the distal end 806 of the arm 404 of the actuating lever 44 moves down relative to its locked position and the proximal end 804 of the arm 404 moves up relative to its locked position about a pivot point 49. When this happens, the elongated rod 402 is moved up in direction A, thereby withdrawing the tab projection 46 from the holes 73 and 75 and releasing the tablet computer 16. As such, when the push button 42 is depressed by the user, the tablet computer 16 may be withdrawn from the housing assembly 14. The rolling element 48 and pin 50 are used so as to reduce the amount of friction created when the push button 42 is engaged. When the push button 42 is pushed down, it is guided against the side wall 32 of the front enclosure portion 28. The push button 42 can be provided with two parallel recesses with two corresponding ribs on the side wall 32 for proper guiding within recess 34 (see FIG. 3).

FIGS. 9A-B illustrate cross-sectional views of the second section 78 shown in FIG. 7. These figures show a cross-section of the front enclosure portion 28 coupled to the friction hinge 58 which is coupled to the retaining member 38. FIG. 9A depicts the actuation lever 44 in its locked position with the tab projection 46 extending through the holes 73, 75 on the guide plate 36 and back wall 24 of the front enclosure portion 28, respectively. FIG. 9B depicts the actuation lever 44 in its unlocked position as the push button 42 is depressed, with the tab projection 46 being withdrawn from the holes 73, 75 of the guide plate 36 and the back wall 24, respectively. The at least one dowel guide 40 is positioned at the base 27 of the front enclosure portion 28 directly above the electrical connector 56 to align the tablet computer 16 within the channel 302. The stiffening member 54 is also provided at the base 27 of the front enclosure portion 28 to provide support for the table computer 16, and the friction hinge 58 is attached to the base 27 of the front enclosure portion 28 through the stiffening member 54.

Figure 10:
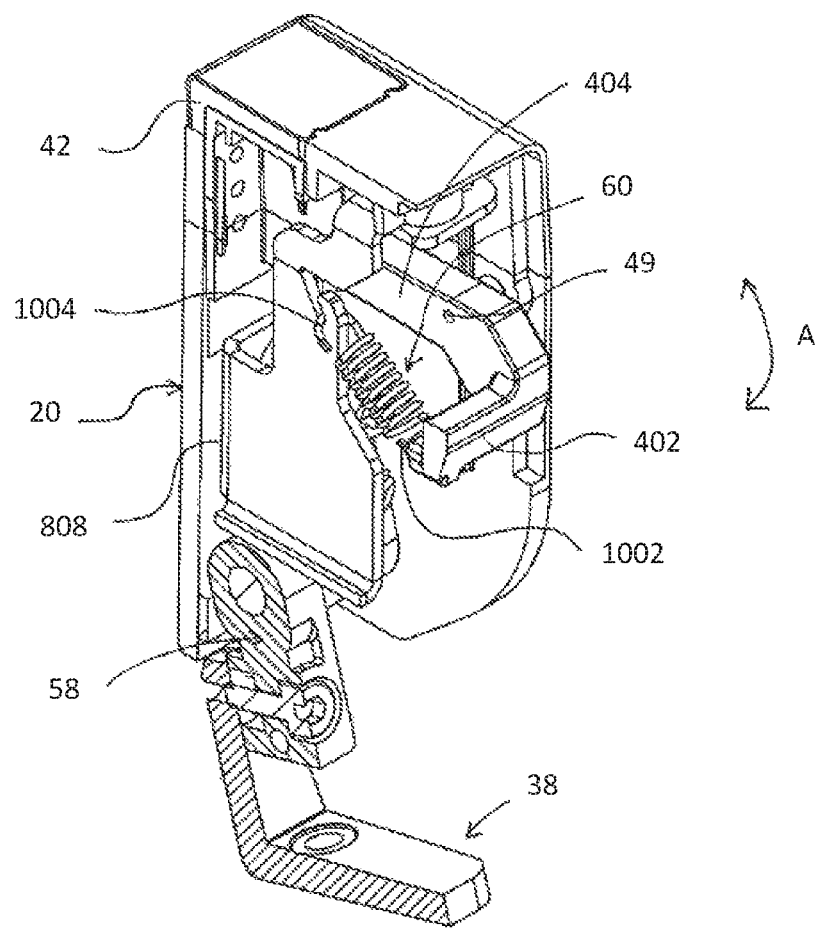
FIG. 10 is a rear perspective view of the housing assembly of FIG. 1 showing the retaining spring, in accordance with an embodiment of the invention.

With reference to FIG. 10, the actuating lever 44 of the locking subsystem 26 is kept in its original (locked) position via a retaining spring 60. The retaining spring 60 has a first end 1002 that connects to the elongated rod 402 of the actuating lever 44. The retaining spring 60 has a second end 1004 opposite the first end 1002 that connects to the stiffening member 54. In another embodiment, the spring 60 may connect to the inside surface 808 of the front wall 20 of the front enclosure portion 28 (not shown). The retaining spring 60 biases the actuating lever 44 to its locked position. When in an unlocked position, where the switch 42 is depressed and the actuating lever 44 is moved, the retaining spring 60 is protracted along with the actuating lever 44. When the switch 42 is depressed by the user, the elongated arm 404 is pulled against the force of the retaining spring 60 so as to retract the tab projection 46 from the holes 73, 75 of the guide plate 36 and the back wall 24, respectively. When the push button 42 is released, the retaining spring 60 retracts back to its initial state thereby pulling back the actuating lever 44 to its original, locked state.

In an exemplary embodiment, the retaining spring 60 is an extension spring with ends of hook type and the retaining spring 60 includes a outside diameter of about 6.5 mm, wire diameter of about 0.8 mm, free length of about 16.0 mm, installed length of about 19.0 mm (will have some pre tensions when installed), extended length of about 22.0 mm, minimum load of about 0.50 kgs, maximum load of about 4.0 kgs, spring rate of about 0.20 kg/mm. In one particular embodiment, the retaining spring 60 is made of stainless steel material.

Figure 11D:
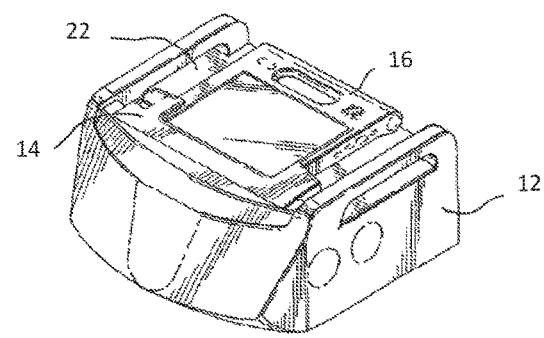
FIG. 11D is a front perspective view of the docking system of FIG. 1, showing the housing assembly in a flat position, in accordance with an embodiment of the invention.

As discussed herein, FIGS. 11A-D illustrate the housing assembly 14 coupled to the input-output module 12. As shown in FIG. 11A, the housing assembly 14 is attached to the top surface 22 of the input-output module 12 via screws 69 through holes 71 of the retaining member 38. The housing assembly 14 may be folded down into the recess 210 when a tablet computer 16 is connected thereto. The recess 210 receives the front enclosure portion 28 so that the tablet computer 16 can lay flat on the top surface 22. A rubber or plastic rest 212 is provided so the tablet computer 16 does not extend too far to the top surface 22. As shown in FIGS. 11B-D, the housing assembly 14 has a range of motion D (due to friction hinge 58 and retaining member 38) such that the tablet computer 16 can be viewed at different angles with respect to the top surface 22 of the input-output module 12.

Figure 12:
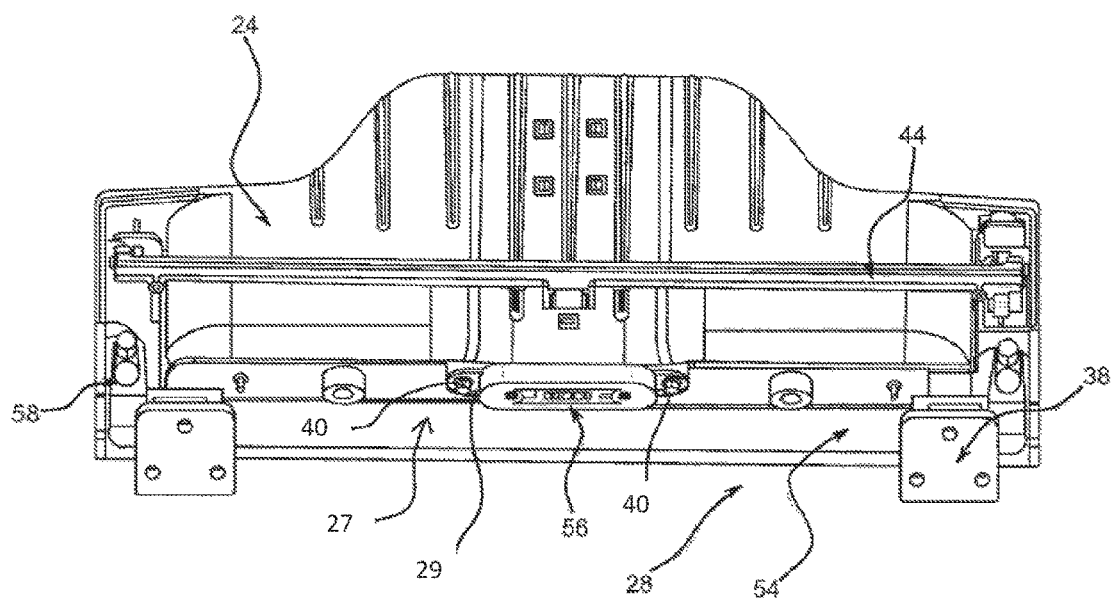
FIG. 12 is a rear view of the front enclosure portion of the housing assembly of FIG. 3 without a back cover, in accordance with an embodiment of the invention.

FIG. 12 illustrates the back side 24 of the front enclosure portion 28 illustrated in FIG. 3 with the back cover 30 removed. The base 27 of front enclosure portion 28 is provided with a cut out 29 to accommodate the electrical connector 56 and at least two dowel guides 40 positioned on either sides of the connector 56 (as discussed above). The connector 56 is a pogo connector which electronically connects the tablet computer 16. The dowel guides 40 are located on either side of the connector 56 to align the tablet computer 16 with the pogo connector 56. A cable 1050 connects the electronics (processing device, memory, etc.) of the tablet computer 16 to a processor housed within the input-output module 12 (see FIGS. 9A-B). When the tablet computer 16 is positioned within the housing assembly 14, it electrically connects to connector 56 which is connected to input-output module 12 via cable 1050. The cable 1050 is preferably flexible so that it can move with the tablet computer 16 as its viewing angle is adjusted.

Figure 13:
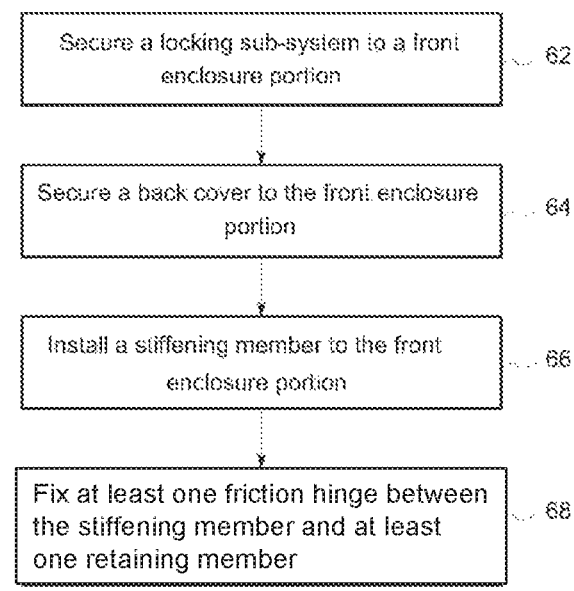
FIG. 13 is a flowchart representing the steps in an exemplary method of assembling the housing assembly in accordance with an embodiment of the invention.

FIG. 13 represents steps in an exemplary method of assembling the housing assembly 14 of the docking system 10. The method includes the steps of securing the locking subsystem 26 to the front enclosure portion 28 (in step 62). In one embodiment, the securing of the locking subsystem 26 includes securing the at least one retaining member 38 by semi-permanently attaching it (by use of removable screws 69) to the input-output module 12. After the locking subsystem 26 is fixed to the front enclosure portion 28 in step 64, the back cover 30 is fixed on the backside 24 of the front enclosure portion 28. In one embodiment, the back cover 30 is fixed to the front enclosure portion 28 using screws. The stiffening member 54 is removably fixed to the base 27 of front enclosure portion 28 in step 66. The friction hinge 58 is mounted between the stiffening member 54 and the retaining member 38 in step 68. The whole housing assembly 14 is then mounted to the input-output module 12 as discussed above.

Figure 14:
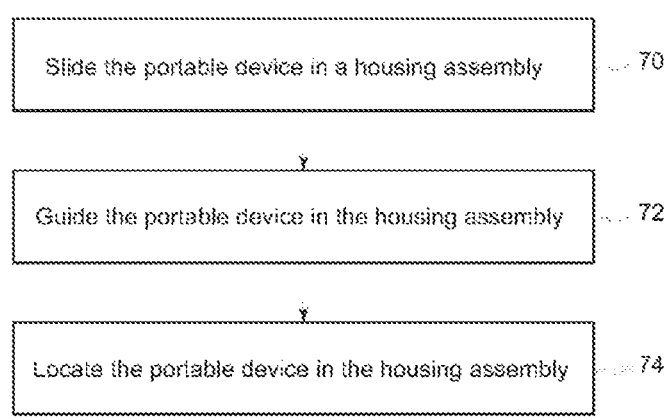
FIG. 14 is a flowchart representing the steps in an exemplary method of securing the portable device in accordance with an embodiment of the invention.

FIG. 14 represents steps in an exemplary method of securing the portable device 16 to the housing assembly 14 in FIG. 1. In the first step 70, the portable device 16 at least partially slides into channel 302 of the front enclosure portion 28 of the housing assembly 14. Once the portable device 16 is partially inside the housing assembly 14, it is guided with respect to the guiding plate 36 in step 72. As the portable device 16 reaches the bottom of the housing assembly 14, in step 74, the portable device 16 is aligned in the housing assembly 14 with the dowel guide(s) 40 on the base 27 of the front enclosure portion 28. In another embodiment, the portable device 16 is positioned in the housing assembly 14 via at least two dowel guides 40 provided on the bottom rear end of the front wall 20 (not shown).

The various embodiments of a docking system for a portable device described above thus provide a way to provide a modular, compact and portable docking system enables multiple viewing directions, helps in user handling and ergonomics.

Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. Similarly, the various features described, as well as other known equivalents for each feature, may be mixed and matched by one of ordinary skill in this art to construct additional systems and techniques in accordance with principles of this disclosure.

While only certain features of the invention have been illustrated and described herein, many modifications and changes will occur to those skilled in the art. It is, therefore, to be understood that the appended claims are intended to cover all such modifications and changes as fall within the true spirit of the invention.

We claim:

1. A docking system for a portable device, comprising:
a base module;
a housing assembly for removably receiving the portable device, the housing assembly having an elongated bottom surface that faces the base module;
at least one L-shaped retaining member rotatably coupling the housing assembly to the base module, wherein the at least one L-shaped retaining member is rotationally and directly coupled to the elongated bottom surface and extends outward from the elongated bottom surface; and
a quick release locking system comprises a switch and an actuating lever for releasably locking the portable device to the housing assembly;
a stiffening member removably fixed to the base module;
wherein the actuating lever includes an actuating arm at a first end and a coupling arm at a second end opposite the first end, wherein the coupling arm is pivotally connected to the stiffening member;
a friction hinge having a first arm rotatably coupled to a second arm located opposite to the first arm;
wherein the first arm is coupled to the housing assembly and the second arm is coupled to the at least one L-shaped retaining member; and
wherein the friction hinge is coupled between the stiffening member and the at least one L-shaped retaining member, such that the at least one L-shaped retaining member extends downward with respect to the friction hinge.

2. The docking system according to claim 1, wherein the housing assembly is operable at viewing angles in the range between about 0 to about 70 degrees.

3. The docking system according to claim 1, wherein the housing assembly comprises a front enclosure portion formed by a front wall, a side wall, a back wall, a base, and a back cover disposed on the back wall of the front enclosure portion.

4. The docking system according to claim 3, wherein the front wall of the front enclosure portion extends obliquely downward and rearward toward the back wall forming a U-shaped structure.

5. The docking system according to claim 3, wherein the front enclosure portion is formed as a unitary piece.

6. The docking system according to claim 1, wherein the actuating lever has a tab projection for lockably engaging the portable device, whereby actuation of the switch unlocks the portable device from the actuating lever.

7. The docking system according to claim 6, wherein the actuating lever is provided with a rolling lever and a pin for transmitting the motion from the switch.

8. The docking system according to claim 6, wherein the switch comprises a push button guided on the front enclosure portion.

9. The docking system according to claim 3, wherein the back wall is provided with a guide plate.

10. The docking system according to claim 3, wherein the base of the front enclosure portion is provided with a cut out to accommodate a connector and at least two dowel guides positioned on either sides of the connector.

11. A docking system for a portable device, comprising:
a base module;
a housing that faces the base module is at least partially receiving the portable device and operable between a plurality of viewing angles; and
a locking system comprised of a manual switch and an actuating lever provided on the housing for locking the portable device to the housing,
wherein the actuating lever has an upward locked position in which the housing is locked to the portable device, and a downward unlocked position in which the housing is unlocked from the portable device, and the manual switch pivotally moves the actuating lever between the locked and unlocked positions when the manual switch is depressed by a user;
at least one L-shaped retaining member, wherein the at least one L-shaped retaining member is rotationally coupled to a bottom surface of the housing and extends outward from the bottom surface of the housing;
a stiffening member removably fixed to the base module;
wherein the actuating lever includes an actuating arm at a first end and a couple arm at a second end opposite the first end, wherein the coupling arm is pivotally connected to the stiffening member;
a friction hinge having a first arm rotatably coupled to a second arm opposite the first arm, wherein the first arm is coupled to the housing and the second arm is coupled to the at least one L-shaped retaining member, wherein the friction hinge is coupled between the stiffening member and the at least one L-shaped retaining member such that the at least one L-shaped retaining member extends downward with respect to the friction hinge.

12. The docking system according to claim 11, wherein the housing is disposed partially within an input-output module.

13. The docking system according to claim 12, wherein the at least one L-shaped retaining member rotatably couples the housing to the input-output module.

14. The docking system according to claim 11, wherein the housing is rotated to viewing angles in the range between about 0 to about 70 degrees.

15. A housing for a docking system of a portable device, comprising:
a base module;
a front enclosure portion formed by a front wall, a side wall, a bottom surface and a back wall forming a channel to at least partially receive the portable device;
wherein the bottom surface of the front enclosure portion faces the base module;
at least one L-shaped retaining member, wherein said at least one L-shaped retaining member is rotationally coupled to the bottom surface of the front enclosure portion and extends outward from the bottom surface of the front enclosure portion;
an electrical connector positioned at the bottom surface of the front enclosure portion to couple with an electrical cable;
a quick release locking system comprised of a switch and an actuating lever for releasably locking the portable device to the front enclosure portion;
a stiffening member removably fixed to the base module, wherein the actuating lever is comprised of an actuating arm at a first end and a coupling arm at a second end opposite the first end, wherein the coupling arm is pivotally connected to the stiffening member; and a friction hinge having a first arm rotatably coupled to a second arm located opposite to the first arm, wherein the first arm is coupled to the front enclosure portion and the second arm is coupled to the at least one L-shaped retaining member, wherein the friction hinge is coupled between the stiffening member and the at least one L-shaped retaining member such that the at least one L-shaped retaining member extends downward with respect to the friction hinge.

16. The housing according to claim 15, wherein the housing assembly is disposed partially within an input-output module and is operable between a plurality of viewing angles.

17. The housing according to claim 15, further comprising: the actuating lever having a tab projection for locking the portable device, wherein actuation of the switch unlocks the portable device from the actuating lever.

18. The housing according to claim 17, wherein the actuating lever is provided with a rolling element and a pin on the first end, said rolling element engaging said switch and transmitting the motion from said switch to pivot the actuating lever.

19. The housing according to claim 17, wherein the switch is a depressable button.

20. The docking system of claim 6, wherein the switch is a depressable button which raises an arm of the actuating lever.

21. The docking system of claim 1, wherein the at least one retaining member is coupled to a top surface of the housing assembly via fasteners.

22. The docking system of claim 21, wherein the fasteners are removable.

23. The docking system of claim 11, the first end of said actuating lever having a rolling element that engages the manual switch, and the second end of said actuating lever having a projecting element that engages an opening in the portable device to releasably lock the portable device to the housing.

* * * * *